United States Patent
Chou et al.

(10) Patent No.: US 7,539,806 B2
(45) Date of Patent: May 26, 2009

(54) ARBITRATOR AND ITS ARBITRATION METHOD

(75) Inventors: Jenya Chou, Shanghai (CN); Minliang Sun, Shanghai (CN)

(73) Assignee: Magima Digital Information Co. Ltd., Shanghai (CN)

( * ) Notice: Subject to any disclaimer, the term of this patent is extended or adjusted under 35 U.S.C. 154(b) by 0 days.

(21) Appl. No.: 11/741,114

(22) Filed: Apr. 27, 2007

(65) Prior Publication Data

US 2007/0255873 A1 Nov. 1, 2007

Related U.S. Application Data

(63) Continuation of application No. PCT/CN2004/001220, filed on Oct. 28, 2004.

(51) Int. Cl.
G06F 13/14 (2006.01)

(52) U.S. Cl. .................................. 710/243; 710/111

(58) Field of Classification Search ................. 710/243, 710/111, 116, 120, 123
See application file for complete search history.

(56) References Cited

U.S. PATENT DOCUMENTS

| | | | | |
|---|---|---|---|---|
| 4,620,279 A | * | 10/1986 | Read et al. ...................... | 710/22 |
| 4,661,952 A | * | 4/1987 | von Sichart et al. ......... | 370/460 |
| 5,146,582 A | * | 9/1992 | Begun ........................ | 712/229 |
| 5,535,340 A | * | 7/1996 | Bell et al. .................... | 710/112 |
| 5,546,548 A | * | 8/1996 | Chen et al. .................. | 710/116 |
| 5,729,702 A | * | 3/1998 | Creedon et al. ............. | 710/111 |
| 5,765,022 A | * | 6/1998 | Kaiser et al. .................. | 710/22 |
| 5,832,278 A | * | 11/1998 | Pham ........................ | 710/243 |
| 6,119,196 A | * | 9/2000 | Muller et al. ............... | 710/243 |
| 6,272,580 B1 | * | 8/2001 | Stevens et al. ............. | 710/116 |
| 6,976,106 B2 | * | 12/2005 | Tomlinson et al. .......... | 710/113 |
| 7,120,113 B1 | * | 10/2006 | Zhang et al. ................ | 370/229 |

FOREIGN PATENT DOCUMENTS

| | | |
|---|---|---|
| CN | 1403913 A | 3/2003 |
| JP | 330291 A | 12/1997 |
| TW | 377413 A | 12/1999 |

* cited by examiner

*Primary Examiner*—Paul R Myers
(74) *Attorney, Agent, or Firm*—Dorsey & Whitney LLP

(57) ABSTRACT

The present invention provides an arbiter and its arbitration method. The master devices in the bus system can be divided into primary master devices and secondary master devices. Said arbiter has first and second stage arbitration modules, wherein the second stage arbitration module can be used for arbitrating bus usage requests sent by secondary master devices, and the first stage arbitration module can be used for arbitrating the arbitrated result of the second stage arbitration module and bus usage requests sent by primary master devices together, so that it can set arbitrating opportunity against different bus usage requests so as to raise arbitration efficiency and bus usage efficiency. The arbiter also provides reverse arbitration ability, which can avoid the conflict among returning data based on improving the bus usage efficiency.

7 Claims, 6 Drawing Sheets

ARBITRATOR AND ITS ARBITRATION METHOD

CROSS-REFERENCE TO RELATED APPLICATION(S)

This application is a continuation of International application number PCT/CN2004/001220, filed Oct. 28, 2004, the contents of which are herein incorporated in their entirety by reference.

BACKGROUND OF THE INVENTION

1. Field of the Invention

The present invention relates to an arbiter and arbitration method and, more particularly to an arbiter and an arbitration method used in a multiple devices system, which can quickly and efficiently arbitrate bus usage request sent by each device so as to improve the bus usage efficiency.

2. Description of the Background Art

Rapid development of semiconductor production process has greatly accelerated Integrated Circuit (IC) design; in particular, Deep Sub Micron (DSM) technology has promoted System on Chip (SOC) design to the front of IC design. The SOC is to integrate plural processors on various chips onto a common chip, so as to form an integrated system having optimal function and performance. Compared with multi-chip system, die size and package pins of the SOC have greatly decreased, so production cost has largely reduced. On the other hand, as Intellectual Property (IP) reusing has shortened the design period of the SOC, design cost has also reduced.

SOC may comprise various processors (such as Central Processing Unit (CPU), Digital Signal Processor (DSP), Application Specific Integrated Circuit (ASIC) and so on) and memories. In addition, the SOC may also comprise subsystems embedded with processor cores. Considering that SOC is more complicated than multi-chip system, how to effectively control operation of each processor or sub-system is very important during a system design. Bus structure is used to accomplish intercommunications including instruction transfer and data transfer among the processors or sub-systems in the system, accordingly, design of the bus structure is crucial to the collaborative work of the whole system.

In a signal transfer among multiple devices of a bus system, a device which sends a request to the bus asking for data transfer is called a master device; whereas a target device which will receive the data transfer from the master device is called a slave device. Arbiter is used in the bus system to arbitrate bus usage requests sent by the devices of the multiple devices system, such that a device which has the use privilege of the bus can be decided by use of various algorithms. According to arbiter configuration, the present bus structure includes distributed and centralized bus structure. In the distributed bus structure, each device is configured with a correspondent arbiter, and one device can be authorized to use the bus through the arbiters' competition. In the centralized bus structure, only one arbiter is used, and one device can be authorized to use the bus according to a predetermined arbitration method which centralizedly arbitrates bus usage requests sent by all devices. It is easily understood that the arbiter especially in the centralized bus system plays an important role to the bus usage efficiency.

In the prior art, if a master device sends a bus usage request to the arbiter and is authorized to use the bus, the master device may always occupy the bus till the transfer operation is completed, accordingly no response to bus usage requests sent by other master devices will occur. Therefore, designers may set priority to the master devices, and the bus usage request sent by the device having high priority can be responded firstly on the same condition during the arbitration of the arbiter. Additionally, some designers propose to set priority to the bus usage requests sent by the master devices, and the arbiter can respond to the bus usage request according to its priority. But hardware design and algorithm of the arbiter may be complicated if the arbiter is used to arbitrate bus usage requests having different priority, and the arbitration period may also be delayed.

On the other hand, in a bus system supporting separated read operation such as a bus system having multithread master devices, before a slave device responds to a read operation sent by one thread of a master device, signal transfer operations (certainly including read operations) sent by other threads of the master device may also be permitted, accordingly, multiple threads may be waiting for data of the corresponding slave devices, in such case, if the slave device corresponding to the earlier read operation needs more data preparation time, returning data for the read operations of other threads must be affected according to the sending order of the read operations. In order to improve the bus usage efficiency, prepared data is permitted to return at first without considering the sending order of the read operations; whereas returning data conflict may occur while different slave devices send data to the bus at the same time, as a result, access delay may be increased and bus efficiency may be reduced.

To solve the problems mentioned above, an improved arbiter and its arbitration method are provided in the present invention, which can do forward direction arbitration as well as reverse arbitration. In the forward direction arbitration, it can set arbitrating opportunity against different bus usage requests. In the reverse arbitration, it can arbitrate returning data requests sent by different slave devices.

SUMMARY OF THE INVENTION

It is an objective of the present invention to provide an improved arbiter and its arbitration method, which set arbitrating opportunity against different bus usage requests so as to raise arbitration efficiency and bus usage efficiency.

It is another objective of the present invention to provide an improved arbiter and its arbitration method, which provide reverse arbitration ability in order to avoid the conflict among returning data based on improving the bus usage efficiency.

The arbiter of the present invention are used for arbitrating bus usage requests sent by devices in a centralized bus system, and the devices in the bus system are divided into master devices and slave devices. The arbiter comprises:

a forward direction first stage arbitration module; and a forward direction second stage arbitration module, the master devices are further divided into primary master devices and secondary master devices, the second stage arbitration module is used for arbitrating bus usage requests sent by the secondary master devices, and the first stage arbitration module is used for arbitrating the arbitrated result of the second stage arbitration module and bus usage requests sent by the primary master devices together, the forward direction first stage arbitration module comprises an arbitration state machine which has first and second arbitration states respectively corresponding to first and second arbitrating opportunities, the bus usage requests sent by the master devices are divided into first and second level bus usage requests, the second level bus usage request has higher priority level than the first level bus usage request, wherein the first arbitrating opportunity is used for arbitrating the first and second level bus usage requests together, and the second arbitrating opportunity is only used for arbitrating the second level bus usage request.

The arbitration method of the present invention is used for arbitrating bus usage requests sent by devices in a centralized bus system, and the devices in the bus system are divided into master devices and slave devices. The arbitration method comprises first stage arbitrating and second stage arbitrating, the master devices are further divided into primary master devices and secondary master devices, the second stage arbitrating is used for arbitrating bus usage requests sent by the secondary master devices, and the first stage arbitrating is used for arbitrating the arbitrated result of the second stage arbitrating and bus usage requests sent by the primary master devices together, the first stage arbitrating uses an arbitration state machine which has first and second arbitration states respectively corresponding to first and second arbitrating opportunities, the bus usage requests sent by the master devices are divided into first and second level bus usage requests, the second level bus usage request has higher priority level than the first level bus usage request, wherein the first arbitrating opportunity is used for arbitrating the first and second level bus usage requests together, and the second arbitrating opportunity is only used for arbitrating the second level bus usage request.

The bus system of the present invention comprises master devices, slave devices and an arbiter connected to the bus respectively. The master devices send bus usage requests to the arbiter, then the arbiter authorizes one bus usage request after arbitration, accordingly, the master device which sends the authorized bus usage request can occupy the bus to do data transfer operation with its correspondent slave device. The bus usage requests can be configured with different priority levels by software, and different arbitrating opportunities are set in the arbitration state machine. Only bus usage requests having higher priority level can be arbitrated and those having lower priority level may be omitted in the arbitrating opportunity with shorter time interval; whereas both bus usage requests having higher priority level and those having lower priority level can be arbitrated in the arbitrating opportunity with longer time interval.

Additionally, the bus system of the present invention supports separated read operation. While different slave devices send bus usage requests to the bus for returning data at the same time, the arbiter can arbitrate the returning data requests through a predetermined algorithm. In one embodiment of the present invention, the bus usage requests of returning data sent by slave devices are configured with different priority levels by software, and the arbiter can arbitrate according to the priority levels.

According to one embodiment of the present invention, the arbiter layers arbitration to multiple devices on the bus, the requests needing lower response speed are arbitrated in the lower level arbitration module, and the requests needing higher response speed are arbitrated in the higher level arbitration module together with the arbitrated result of the lower level arbitration module. The arbiter comprises first and second stage arbitration modules; correspondingly, the arbitration method comprises first and second stage arbitrating. The master devices in the bus system are further divided into primary master devices and secondary master devices, the second stage arbitrating arbitrates bus usage requests sent by the secondary master devices and sends the arbitrated result to the first stage arbitrating. The first stage arbitrating arbitrates the arbitrated result of the second stage arbitrating and bus usage requests sent by the primary master devices together.

The first stage arbitration module further comprise a filter, and different filter units can be set in the filter for filtering the bus usage requests sent by the master devices. The filtered usage requests are valid to participate in arbitration. In one embodiment, the filter comprises a slave device busy state filter unit, the bus usage request is judged through the filter before arbitration, and is omitted if the target slave device has sent a SBusy signal to the filter. In a second embodiment, the filter comprises a last request control filter unit for bus streamline arbitration to mask the last clock period of each ongoing stream burst. In third embodiment, the filter comprises a paired read/write operation filter unit, and the bus is locked during the read operation of a paired read/write operation, meanwhile bus usage requests of paired read/write operation sent by other master devices are omitted.

In general, a leveled arbitrating opportunity is proposed in the present invention to increase the response speed of data transfer operation needing preferential response, as well as to raise arbitration efficiency and bus usage efficiency.

Additionally, a reverse arbitration device is proposed for a bus system supporting separated read operation in the present invention. While multiple slave devices send returning data requests to the bus at the same time, the reverse arbitration mechanism can avoid the bus blocking by data conflict, therefore the bus usage efficiency is also improved.

BRIEF DESCRIPTION OF THE DRAWINGS

The drawings are auxiliary interpretation of the exemplary embodiments according to the present invention. The follow descriptions are used to disclose the feature of the present invention in combination with the drawings, but it is not limited thereto. Wherein.

DESCRIPTION OF THE PREFERRED EMBODIMENTS

Figure 1:
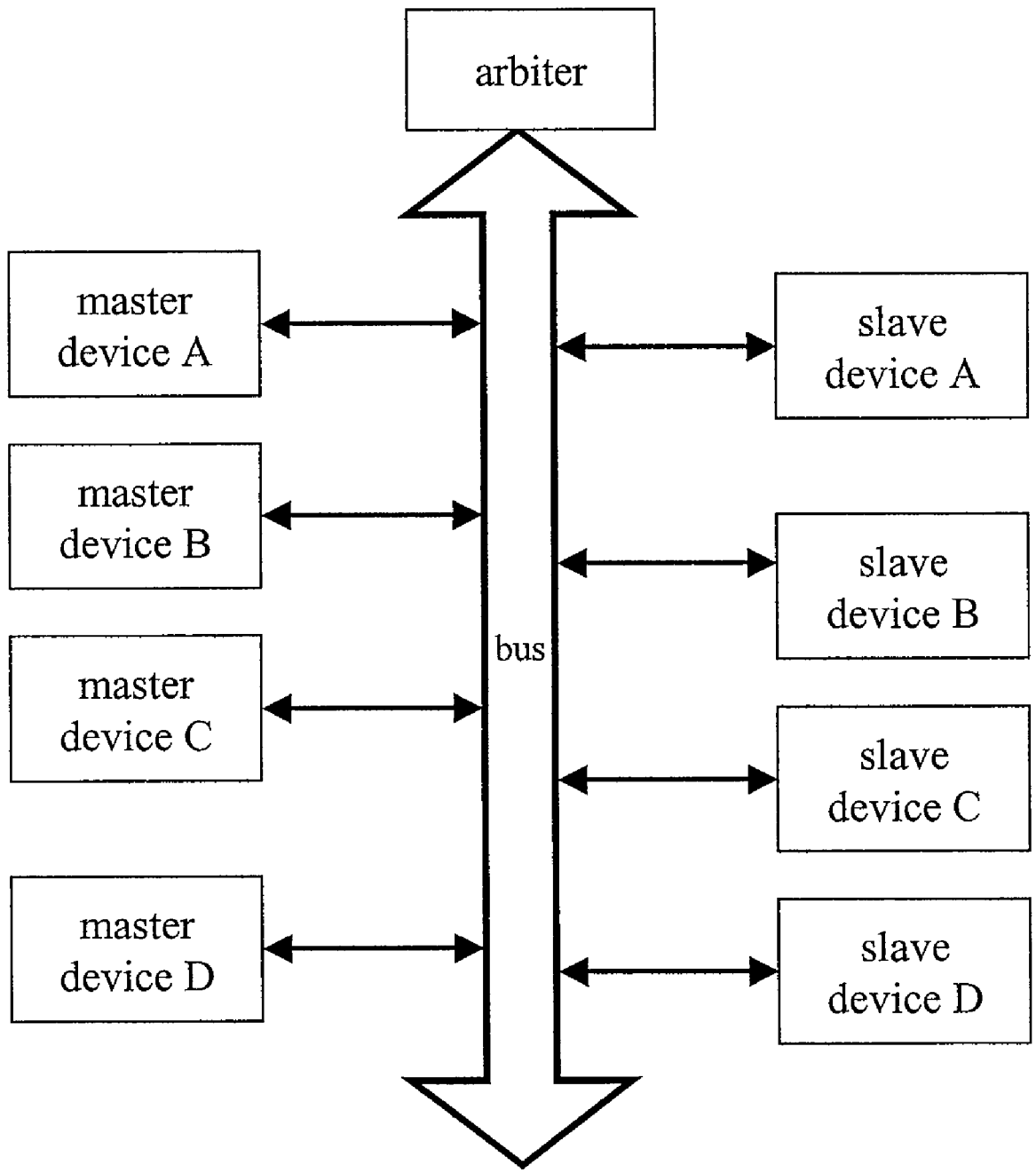
FIG. 1 is a structural view of a bus system according to an embodiment of the present invention.

FIG. 1 shows a bus system according to an embodiment of the present invention. The bus system comprises a bus, master devices A, B, C, D and slave devices A, B, C, D which are connected to the bus. An arbiter coupled to all devices is set on the bus for arbitrating bus usage requests sent by all devices.

In a bus system, multiple master device units can be configured to a master device, wherein each master device unit is called a thread of the master device. The multithread bus system can do arbitration ahead in the master device to raise the arbiter usage efficiency on the bus.

In this embodiment, the master device A has three threads and the master device B has two threads, wherein each thread may be CPU, DSP, ASIC or a sub-system and the like. The master device C and the master device D may be one of CPU, DSP, ASIC and a sub-system.

The master devices are further divided into primary and secondary master devices, wherein the master devices A and B are primary master devices and the master devices C and D are secondary master devices. Generally, the primary master device, for instance, a device for real time process, needs higher bus response speed; whereas the secondary master device does not need high bus response speed. Additionally, the slave device may be Synchronous Dynamic Random Access Memory (SDRAM), Direct Memory Access (DMA) and so on.

The arbiter sends a AMNum signal denoting the master device number to the correspondent master device while it responds to the bus usage request sent by the master devices A, B, C or D, wherein the number 0 represents the master device A, 1 represents the master device B, 2 represents the master device C, and 3 represents the master device D. Furthermore, while the arbiter responds the bus usage request sent by one thread of the master device A or B, it sends a MThreadID signal to the correspondent thread of the master device besides sending the AMNum signal to the master device.

Signal lines are set among the master devices, the slave devices and the arbiter for transferring control signals in the data transfer operation. In this embodiment, a MDstnum signal is a slave device number sent by the master device to the arbiter, wherein the number 0 represents the slave device A, 1 represents the slave device B, 2 represents the slave device C, and 3 represents the slave device D.

The bus usage requests sent by the master devices are divided into different levels, in the present embodiment, a MReq bus request signal wire denoting is set between each master device and the arbiter. MReq bus request signal transferred by MReq bus request signal wire denotes the bus usage request level. The MReq bus request signal is divided into first and second level bus usage requests, wherein REQ is a first level bus usage request, and CREQ and LREQ are second level bus usage requests. The MReq signal is coded in Table 1.

TABLE 1

| MReq | SIGNAL | DESCRIPTION |
| --- | --- | --- |
| 0 0 | IDLE | No request |
| 0 1 | REQ | Ordinary read/write request |
| 1 0 | LREQ | Paired read/write request, cooperating with a MCmd signal. It is a locked read operation if the MCmd signal is 0; It is an unlocked write operation if the MCmd signal is 1. |
| 1 1 | CREQ | Compulsory read/write request |

The MCmd signal is a read/write marking signal, which uses high to represent write operation and low to represent read operation.

The CREQ and LREQ have higher priority levels than the REQ, so the CREQ or LREQ sent by the master devices will be responded more rapidly than the REQ. The LREQ is a type of paired read/write request, which needs an uninterrupted read/write operation. Therefore, the LREQ is set to be a type of request with higher priority level.

The MReq signal can be set in every data transfer by software programming and the priority level of the bus usage requests can be decided by actual demand. To those skilled in the art, it is easily understood that the level and code of the MReq signal can be set in other ways according to actual requirements.

In the present embodiment, data transfer operation between the master and slave devices is in the form of stream burst. China patent application number 03129415.4 which filed by the same applicant as the present application has described the stream burst in detail. The data transfer operation can transfer a great deal of data at a time, and the data of each stream burst includes multiple single data and multiple burst data. A single data or a burst data with continuous addresses in the stream burst is called a segment burst, and the address between the segment bursts may be incontinuous. Different segment bursts in the stream burst can be sent to different target slave devices. The length of the segment bursts may be integer power of 2 and the addresses of the segment burst may be aligned.

According to the burst stream, a transfer state signal MLast which denotes the data transfer state is set to every master device or every thread of the master device. The stream burst data transfer operation of this embodiment includes first, second, third and fourth states respectively corresponding to CONT, SAME, DIFF and LAST signals as described in Table 2.

TABLE 2

| MLast[1:0] | SIGNAL | DESCRIPTION |
| --- | --- | --- |
| 0 0 | CONT | denoting a segment burst does not end |
| 0 1 | LAST | denoting a stream burst ends |
| 1 0 | SAME | denoting a segment burst ends, and predicting next segment burst accesses the same slave device as the current segment burst does, and has the same priority level as that of the current segment burst (for example, both are REQ or both are CREQ) |
| 1 1 | DIFF | denoting a segment burst ends, and predicting next segment burst accesses different slave device from the current segment burst does, or has different priority level from that of the current segment burst |

In data transfer operation, the CONT denotes a segment burst is ongoing, i.e. the addresses of the data transfer are continuous, so no new arbitration is needed. The LAST denotes a whole stream burst ends, therefore the arbiter will arbitrate all bus usage requests again for next data transfer operation.

The SAME and DIFF both denote a segment burst of a stream burst ends but the stream burst does not end, the difference between them is that, the SAME predicts next segment burst accesses the same slave device as the current segment burst does but the address may be incontinuous, and has the same priority level as that of the current segment burst (for example, both are REQ or both are CREQ); the DIFF predicts next segment burst accesses different slave device from the current segment burst does, or has different priority level from that of the current segment burst.

Similarly, the MLast signal can be coded in accordance with actual data transfer operation states.

The device on the bus sends the bus usage request to the arbiter while it needs the bus to do data transfer operation, and the arbiter judges out the preferential request by predetermined algorithm. The arbitration of the arbitration in the present invention comprises forward direction arbitrating and reverse arbitrating, wherein the forward direction arbitrating means to arbitrate the bus usage requests sent by master devices, and the reverse arbitrating means to arbitrate the bus usage requests of returning data in the read operations sent by slave devices.

Figure 2:
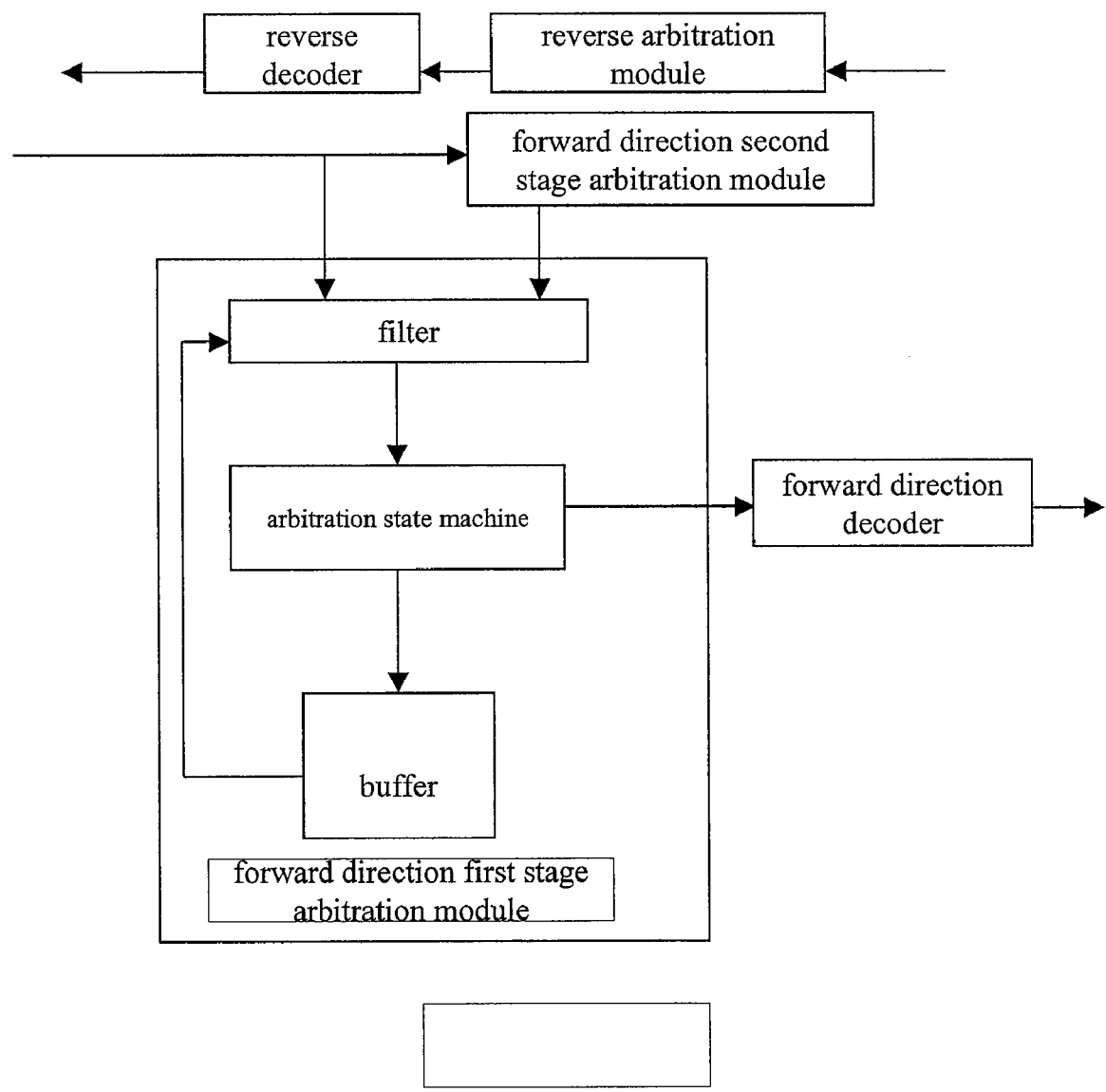
FIG. 2 is a structural view of an arbiter according to an embodiment of the present invention.

Referring to FIG. 2, the arbiter of the present embodiment comprises a forward direction second stage arbitration module, a forward direction first stage arbitration module and a reverse arbitration module. Signals of the forward direction arbitration module are decoded in a forward direction decoder and sent to the master and slave devices. Signals of the reverse arbitration module are decoded in a reverse decoder and sent to the master and slave devices. The forward direction second stage arbitration module arbitrates bus usage requests sent by the secondary master devices and sends the arbitrated result to the first stage arbitration module. The first stage arbitrating arbitrates the bus usage requests sent by the primary master devices and the arbitrated result of the second stage arbitration module together. In other embodiments, the second stage arbitration module can also be omitted.

Figure 3:
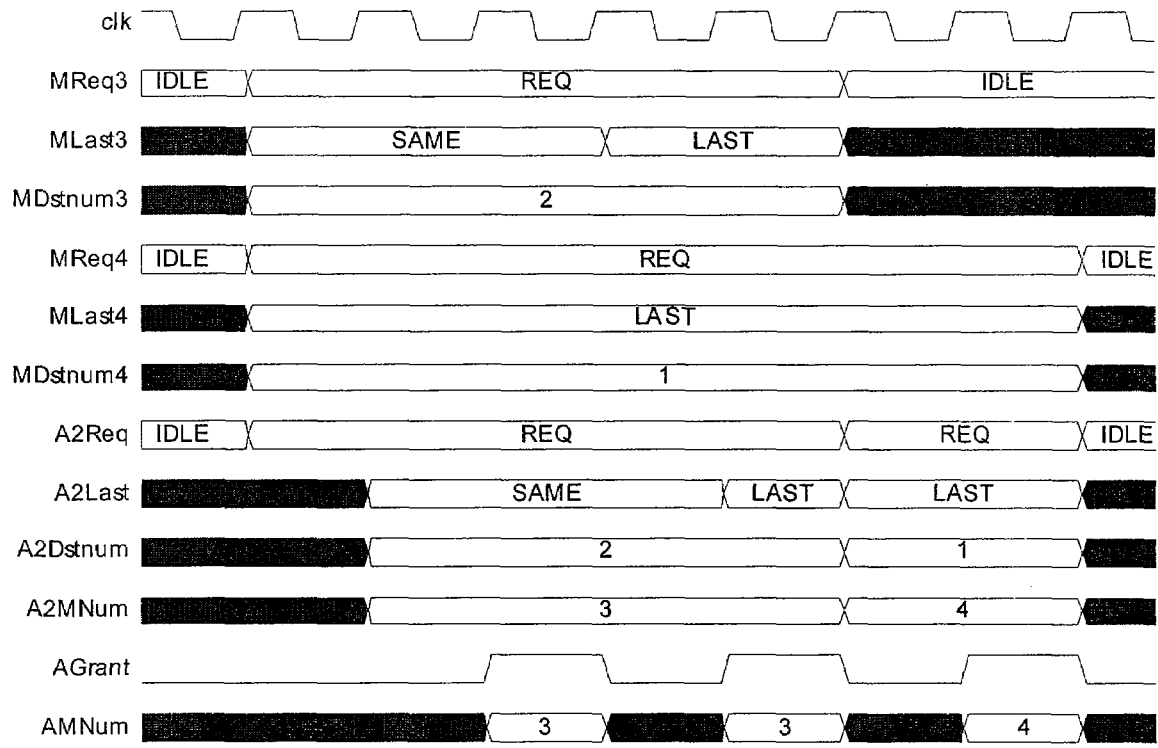
FIG. 3 is an arbitrating timing diagram of a second stage arbitration module according to an embodiment of the present invention.

If the second stage arbitration module is not in busy state, the second stage arbitrating can do a new arbitration. The arbitration algorithm can be selected from various algorithms known to those in the art. In order to simplify the description of the present invention, a priority algorithm which sets a determinate priority level to each secondary master device is used in the forward direction second stage arbitration module. If two or more secondary master devices send requests at the same time, the master device having higher priority level is selected and sent to the first stage. As shown in FIG. 3, the secondary master device C has a first priority level and the secondary master device D has a second priority level. The signals of the master device C includes MReq3, MLast3 and MDstnum3 respectively represent the request level, data transfer state and target slave device number, similarly the signals of the master device D includes MReq4, MLast4 and MDstnum4. If the master devices C and D send the bus usage requests at the same time, the arbiter firstly selects master device C according to the priority levels, and the arbiter responds to the master device D after the response of the master device C is completed. The arbitration signals A2Req, A2Last, A2Dstnum and A2Mnum respectively representing the bus usage request level, data transfer state, target slave device number and responsive master device number are the arbitrated result of the second stage arbitration module and may be sent to the first stage arbitration module to participate in arbitration. In this embodiment, if no other bus usage request in the first stage arbitration module is arbitrated together with the arbitrated result of the second arbitration module, the forward decoder sends out arbitration signals including a bus authorized signal AGrant and an authorized master device signal AMNum to respond the bus usage requests from the master devices C and D in turn.

All requests to be arbitrated need to be filtered through a filter in the forward direction first stage arbitrating of the arbiter. The filter shields the requests which can not be performed at present in accordance with filter conditions. The requests passed through the filter are called valid requests. The filter of the present embodiment comprises three filter units.

The first unit is a slave device busy state (SBusy) filter unit. The bus usage request which accesses a slave device in an idle state can pass through the filter. For example, each slave device is configured with a receiving buffer which is a First In First Out (FIFO) register, if the remaining space of the buffer only supports a burst data or a burst data plus 1, the correspondent slave device sends a slave device busy signal SBusy denoting the slave device number to the arbiter.

The second unit is a paired read/write request control filter unit for the LREQ bus usage request. A read operation of a LREQ request can be responded if the bus is unlocked, otherwise it is shielded if the bus is locked. The bus is locked means that a LREQ request has been sent by another master device or thread and the read operation of the LREQ request is ongoing. Accordingly, the mistake of the foregoing LREQ request can be avoided even if the read operation of a new LREQ request is sent to the bus.

The third unit is a last request control filter unit for streamline arbitration, such that the bus system can deal with multiple bus usage requests continuously. To the last clock period request of the stream burst being transferred, the arbiter needs to judge the data transfer state signal ALast for deciding the next arbitration state, so the arbiter shields the last clock period request of the stream burst.

Additionally, other filter units can also be set in the filter in other embodiments.

Figure 4:
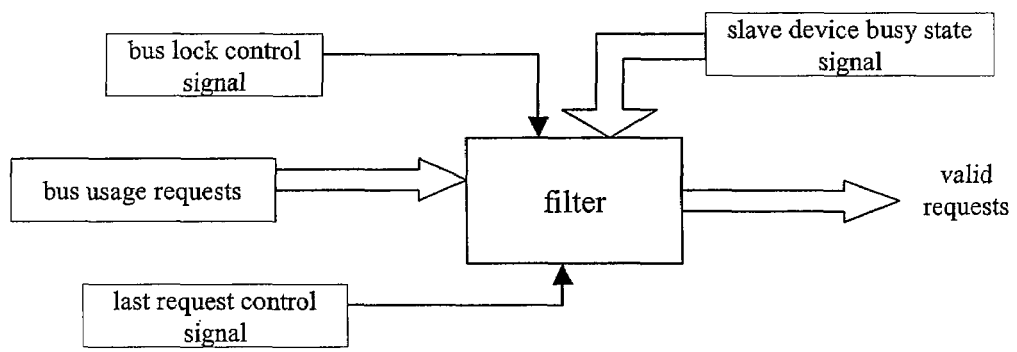
FIG. 4 shows an operation principle of a filter in the arbiter according to an embodiment of the present invention.

Referring to FIG. 4, three control ports respectively connected to the slave device busy state signal, bus lock control signal and last request control signal are set in the filter. The input of the filter receives bus usage requests from the master devices, the output of the filter sends out valid requests which are not shielded in the filter, and the arbiter arbitrates the valid requests by predetermined arbitration algorithm.

Figure 5:
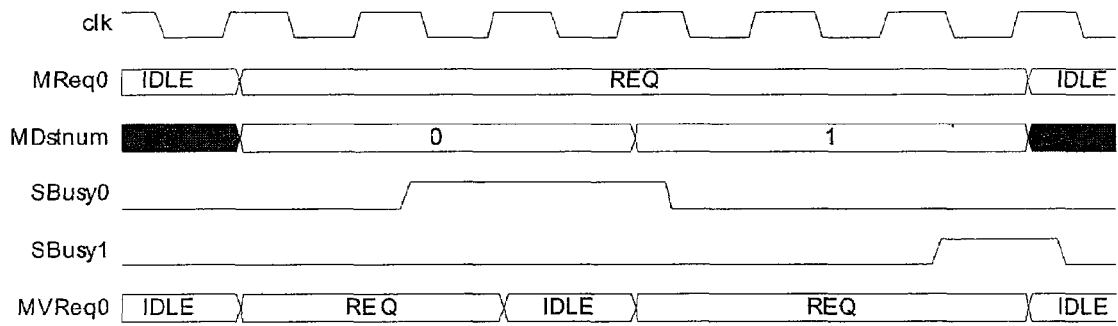
FIG. 5 is a timing diagram of a slave device busy state filter unit of the filter in the arbiter according to an embodiment of the present invention.
Figure 6:
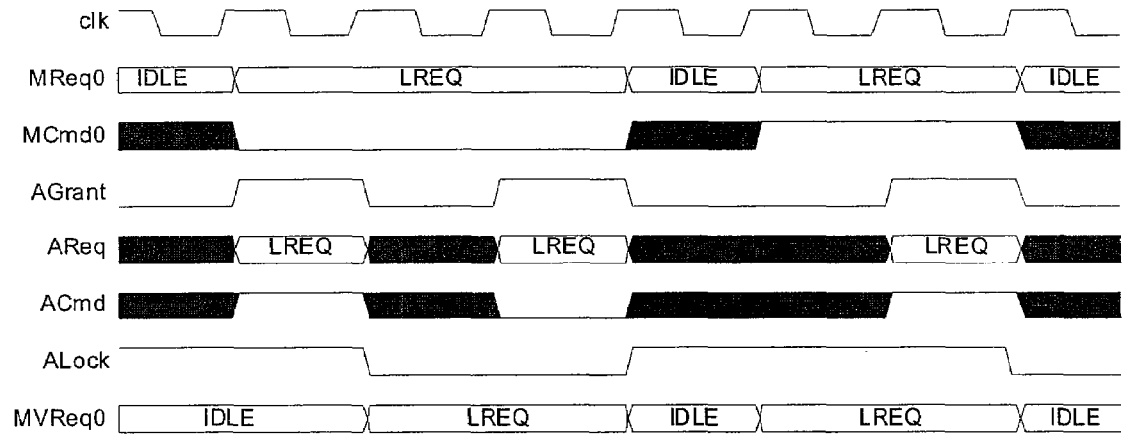
FIG. 6 is a timing diagram of a bus lock control filter unit of the filter in the arbiter according to an embodiment of the present invention.
Figure 7:
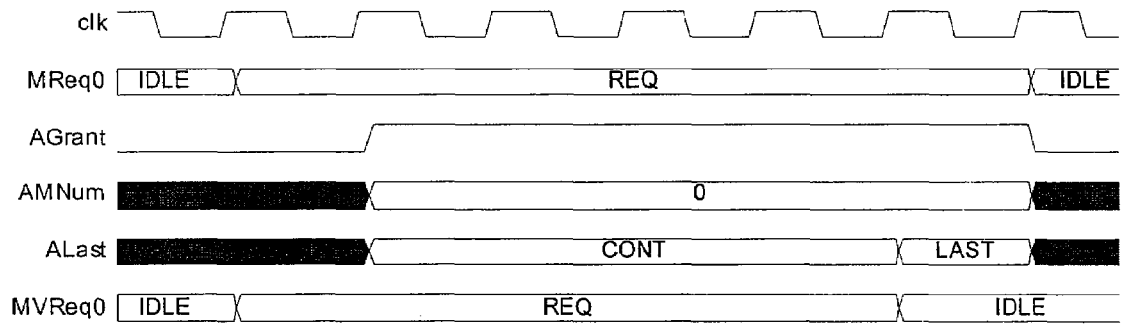
FIG. 7 is a timing diagram of a last request control filter unit of the filter in the arbiter according to an embodiment of the present invention.

FIG. 5 to 7 are operation timing diagrams of three filter units in the filter. In the SBusy filter unit, the arbiter firstly locks the SBusy signals sent by the slave devices, and then does mask operation on the SBusy and the MDstnum signals. If the MDstnum signal denoting the slave device number is the same as one of the valid SBusy signals, it means the slave device accessed by the request can not receive command at present; therefore the filter shields the request. As shown in FIG. 5, The MReq0 is the bus usage request signal sent by the master device A, the MDstnum denotes the slave device accessed by the request, and the MVReq0 is the valid request signal output from the filter. The SBusy0 is valid in the next clock period, accordingly the access from the MReq0 to the slave device A (MDstnum is 0) in the last clock period is shielded (MVReq is IDLE). As there is no valid SBusy1 in the access from the MReq0 to the slave device B (MDstnum is 1), the access to the slave device is not shielded.

In the bus lock control unit, an ALock signal on the bus lock control port is set to high if the bus is in lock state. The filter does mask operation on the ALock and the MReq signals. If the bus is in lock state and the MReq signal is LREQ, the filter will shield the request. As shown in FIG. 6, the MReq0 and MCmd0 are bus usage requests sent by the master device A, the AReq and ACmd are response signals sent by the arbiter respectively denoting the level of the authorized request and the read/write state, the AGrant is the authorized signal of the arbiter, and the MVReq0 is the valid request of the master device A output from the filter. While the AGrant is high and the AReq is LREQ, the ALock is set to high if the ACmd is low (means read request), and the ALock is set to low if the ACmd is high (means write request). The arbiter does not arbitrate read operation of other LREQ while the ALock is high. The first LREQ of the MReq0 is a read operation, but the ALock is high in the first clock period of the LREQ, therefore the LREQ is shielded as shown in the MVReq0 signal.

In the last request control filter unit, the arbiter judges the last clock period request of the ongoing stream burst with the AGrant, AMNum and ALast signals. If the AGrant is valid, the AMNum denotes the current master device occupying the bus, and the ALast denotes the last clock period request of the master device, the arbiter shields the last clock period request of the stream burst. As shown in FIG. 7, the MReq0 is the bus usage request sent by the master device A, the ALast denotes the data transfer state of the bus usage request, the master device A is occupying the bus as shown in the AMNum signal, and the last clock period request is shielded as shown in the MVReq0 signal.

The first stage of the forward direction arbitrating does arbitration only on condition that the arbitration is permitted. Generally, first condition for arbitration in the first stage is that the arbiter is in idle state at present. An Arb_state signal is set in the arbiter, while there is no arbitration at present, the Arb_state is IDLE to denote the arbiter is in idle state.

The leveled arbitration of the first stage includes first and second arbitrating opportunities, which are defined as REQ arbitrating opportunity and CREQ arbitrating opportunity, and first arbitrating opportunity control signal AREQ_arb and second arbitrating opportunity control signal ACREQ_arb are set according to the REQ and CREQ.

In this embodiment, the data transfer operation is in the form of stream burst, and the MLast signal is defined as the data transfer state code of the segment burst from the master device to the arbiter. The MLast has three state values to denote the segment burst ends, wherein the LAST denotes a whole stream burst ends, the SAME denotes a segment burst ends but a stream burst does not end and predicts next segment burst accesses the same slave device as the current segment burst does, and the DIFF denotes a segment burst ends but a stream burst does not end and predicts next segment burst accesses different slave device from the current segment burst does. The arbitration state machine may start arbitration while the MLast is in one of the above three states. The stream burst can be interrupted by other CREQ requests and may not be interrupted by other REQ requests. The AREQ_arb and ACREQ_arb signals are both valid if the MLast is LAST, and only the ACREQ_arb is valid if the MLast is SAME or DIFF.

Figure 8:
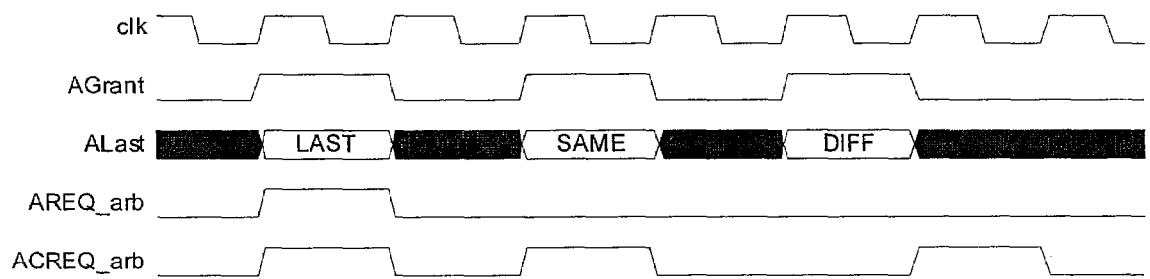
FIG. 8 is a timing diagram of a forward direction arbitrating opportunity according to an embodiment of the present invention.

FIG. 8 shows a timing diagram of the arbitrating opportunity. The MLast sent by the master device is transferred to the ALast through the forward direction decoder, accordingly the ALast also has four state values as CONT, SAME, DIFF and LAST. The ALast can help to judge the arbitration state of the arbiter of the next clock period so as to improve the streamline operation of the bus. The ALast in the figure has three values as LAST, SAME and DIFF. The LAST denotes a stream burst ends, so the AREQ_arb and ACREQ_arb are both valid. The SAME and DIFF both denote a segment burst of a stream burst ends but the stream burst does not end, so only the ACREQ_arb is valid.

The ACREQ_arb is valid while the stream burst or the segment burst ends, and the AREQ_arb is valid only while the stream burst ends. Therefore, the appearance of the valid ACREQ is more than that of the AREQ_arb, in other words, the time interval of the CREQ arbitrating opportunity is shorter than that of the REQ arbitrating opportunity.

Figure 9:
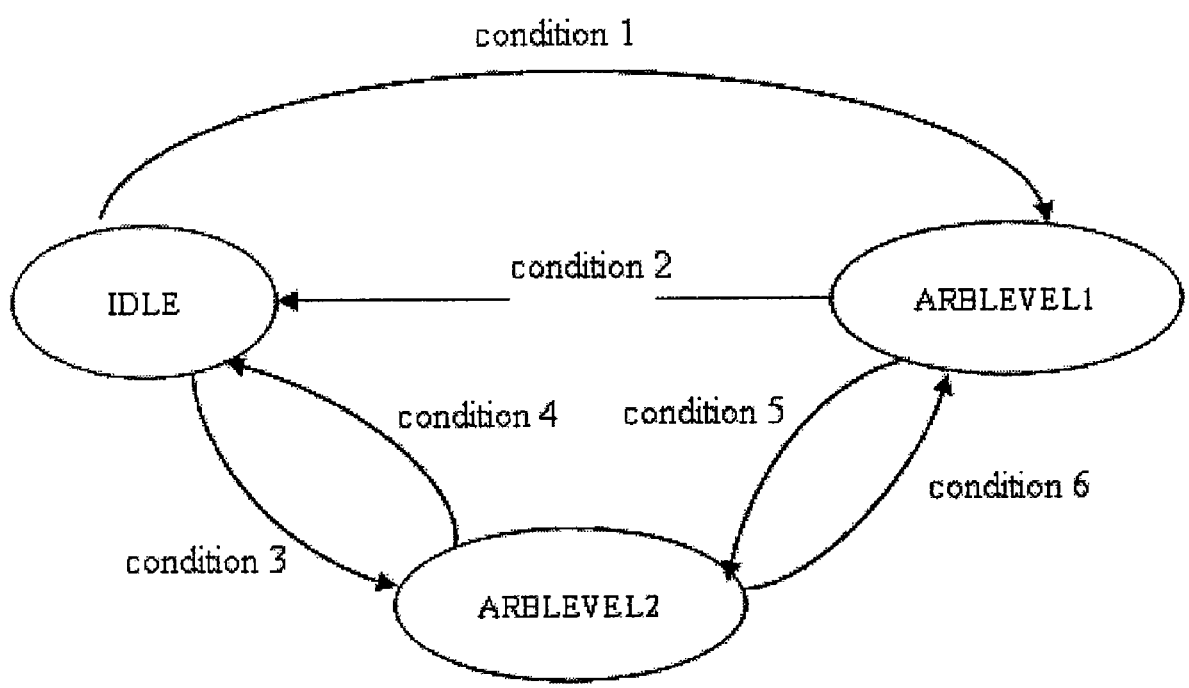
FIG. 9 shows a operation principle of an arbitration state machine according to an embodiment of the present invention.

Referring to FIG. 9, the arbitration state machine comprises first, second and third states which are respectively defined as ARBLEVEL1, ARBLEVEL2 and IDLE, wherein the ARBLEVEL1 is the first arbitrating opportunity REQ, and the ARBLEVEL2 is the second arbitrating opportunity CREQ. The transferring conditions between the states are described in Table 3.

TABLE 3

| | |
|---|---|
| condition 1 | There is at least one REQ request but no CREQ or LREQ request. |
| condition 2 | There is no REQ, CREQ or LREQ request while the AREQ_arb is valid. |
| condition 3 | There is at least one CREQ or LREQ request. |
| condition 4 | There is no REQ, CREQ or LREQ request while the AREQ_arb is valid. |
| condition 5 | There is at least one CREQ or LREQ request while the ACREQ_arb is valid and the AREQ_arb is invalid, and the AEnterST2 is set to 1. |
| condition 6 | There is no CREQ or LREQ request while the ACREQ_arb is valid and the AEnterST2 is 1, and then the AEnterST2 is set to 0. |

As shown in FIG. 9, the arbiter starts arbitration only in the ARBLEVEL1 and ARBLEVEL2 states. While the Arb_state is IDLE, the condition 1 which means there is only REQ request but no CREQ or LREQ request occurs, and the AREQ_arb is valid, the arbiter goes to the ARBLEVEL1 state. The arbiter can arbitrate REQ, CREQ and LREQ bus usage requests sent by the master devices in the ARBLEVEL1 state. While the Arb_state is IDLE, the condition 3 which means there is at least one CREQ or LREQ request occurs, and the ACREQ_arb is valid, the arbiter goes to the ARBLEVEL2 state. The arbiter only arbitrates CREQ and LREQ bus usage requests sent by the master devices in the ARBLEVEL2 state.

The ARBLEVEL1 and ARBLEVEL2 states can transfer to each other in some conditions from FIG. 9; accordingly, an AEnterST2 signal is used in the present embodiment to record the interrupted arbitration spot. If there is a higher level request such as CREQ or LREQ while the arbiter is in the ARBLEVEL1 state, the arbiter goes to the ARBLEVEL2 state and sets the AEnterST2 to 1. if there is no CREQ or LREQ request but only REQ request while the AEnterST2 is 1 and the arbitration of the ARBLEVEL2 state ends, the arbiter goes back to the original arbitration spot and sets the AEnterST2 to 0. The signals of the arbitration spot to be reserved are temporarily saved in buffers, wherein the signals include the responded master device number AMNum from the arbiter to the master device, the responded slave device number ASNum from the arbiter to the slave device and so on. If the IDLE state is directly transferred to the ARBLEVEL2 state, the arbiter arbitrates all valid requests over again after the arbitration of the ARBLEVEL2 ends.

If the ARBLEVEL1 state is directly transferred to the ARBLEVEL2 state while the ACREQ_arb is valid, the slave device busy state signal SBusy is used again for avoiding the overflow of the slave devices. The slave device sends the SBusy signal to the arbiter if the receiving buffer of the slave device is unable to receive the data. The arbiter locks the SBusy signal sent by the slave devices, and then does mask operation on the SBusy and the target slave device number MDstnum. If the MDstnum and SBusy denote the same slave device number, the bus usage request is shielded.

In the ARBLEVEL1 state, the arbiter arbitrates all bus usage requests sent by the master devices by a general algorithm to select a request and sends an authorized signal to the master device of the request, and the master device starts data transfer after receiving the authorized signal. In the ARBLEVEL2 state, the arbiter arbitrates the CREQ and LREQ requests to select a CREQ or LREQ request and sends an authorized signal to the master device of the request, and the master device starts data transfer after receiving the authorized signal. The REQ requests are omitted in the ARBLEVEL2 state. As the algorithm mentioned here such as a single cycle arbitration algorithm is known to those in the art, it is not described herein.

Referring to FIG. 2, the arbiter further comprises a reverse arbitration module. The master devices A and B both have multithread. If one thread is authorized to use the bus, the arbiter sends out the master device number and the thread number. While a request of a thread is not completed, for example, the slave device is not ready for data read, requests of other threads in the same master devices are permitted, therefore returning data requests from different slave devices to different threads may occur at the same time. The reverse arbitration module of the arbiter can arbitrate the bus usage requests of returning data sent by the slave devices. Similar to the forward direction arbitrating, the arbiter sends an ARGrant signal which is valid in high level state to authorize a slave device to occupy the bus after reverse arbitrating the requests sent by the slave devices, and then the authorized slave device does the returning data operation.

The slave devices are further divided into primary and secondary slave devices. In this embodiment, the slave devices A, B and C are primary slave devices, and the slave device D is a secondary slave device. The data transfer rate from the secondary slave device or to the secondary master device is lower than that between the primary slave device and the primary master device. For instance, the data transfer rate between the primary slave device and the primary master device may be one data in every two clock period, and the data transfer rate from the secondary slave device or to the secondary master device may be one data per clock period. If the rate is one data in every two clock period, the arbiter does not arbitrate during the data transfer; accordingly the reverse arbitrating of the arbiter also has arbitrating opportunity.

Figure 10:
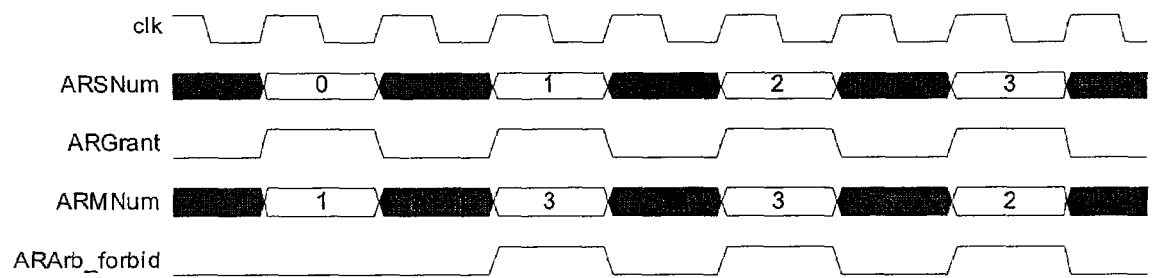
FIG. 10 is a timing diagram of a reverse arbitrating opportunity according to an embodiment of the present invention.

FIG. 10 shows the arbitrating opportunity of the reverse arbitrating. The ARSNum denotes the slave device of the reverse data transfer, the ARGrant denotes the response to the slave device and the correspondent master device, the ARMNum denotes the master device which receives the reverse data transfer, and the reverse requests sent by the slave devices are permitted to be arbitrated if the arbitrating opportunity signal ARArb_forbid is low. As shown in FIG. 10, the ARArb_forbid is low during the reverse data transfer from the primary slave device A to the primary master device B, so the arbitration is permitted; the ARArb_forbid is high during the reverse data transfer from the primary slave device B to the secondary master device C, so the arbitration is not permitted; the ARArb_forbid is high during the reverse data transfer from the secondary slave device C or D, so the arbitration is not permitted.

The reverse requests of the present embodiment are divided into SREQ and CSREQ requests, wherein the CSREQ reverse request has higher priority level than the SREQ reverse request. The arbiter responds the CSREQ request at first, and responds to the reverse requests having same level according to the priority order of the slave devices. For example, The priority order of the slave devices A, B, C and D are set from high to low, the arbiter firstly responds to slave device A if the slave devices A, B, C and D send valid reverse requests at the same time, and the arbiter firstly responds to slave device B if only the slave devices B and C send valid reverse requests at the same time. It should be understood that other equivalent algorithms for the reverse arbitrating should be covered by the present invention.

The embodiment is a clearer description of the present invention, but it is not limited thereto. It is easy to be understood that any modifications and equivalents based on the present invention should be covered by the spirit and scope of the claims of the present invention.

What is claimed is:

1. An arbiter for arbitrating bus usage requests sent by devices in a centralized bus system, said devices in the bus system being divided into master devices and slave devices, said arbiter comprising:
  a forward direction first stage arbitration module; and
  a forward direction second stage arbitration module;
  said master devices being further divided into primary master devices and secondary master devices, said forward direction second stage arbitration module arbitrating bus usage requests sent by said secondary master devices, and said forward direction first stage arbitration module arbitrating an arbitrated result of said forward direction second stage arbitration module and said bus usage requests sent by said primary master devices together;
  said forward direction first stage arbitration module comprising an arbitration state machine which has first and second arbitration states respectively corresponding to first and second arbitrating opportunities, said bus usage requests sent by said master devices being divided into first and second level bus usage requests, wherein said second level bus usage request has a higher priority level than said first level bus usage request, and wherein said first arbitrating opportunity arbitrates said first and second level bus usage requests together, and said second arbitrating opportunity only arbitrates said second level bus usage request; and
  wherein data transfer operation between said master and slave devices is in the form of stream burst transfer operation, wherein one stream burst has one or more segment bursts, and said stream burst data transfer operation includes first, second, third and fourth segment burst data transfer states, wherein said first segment burst data transfer state represents that a segment burst does not end; said second segment burst data transfer state represents that a stream burst does not end; said third segment burst data transfer state represents that a segment burst of a stream burst ends but the stream burst does not end, and a next segment burst accesses the same slave device as the current segment burst does; and said fourth segment burst data transfer state represents that a segment burst of a stream burst ends but the stream burst does not end, and a next segment burst accesses a different slave device from the current segment burst does.

2. The arbiter of claim 1, wherein said first level bus usage request is an ordinary read/write request, and said second level bus usage request is a paired or compulsory read/write request.

3. The arbiter of claim 1, wherein said first stage arbitration module further comprises a filter having filter units for filtering said bus usage requests sent by said master devices, wherein filtered bus usage requests participate in arbitration as valid requests.

4. The arbiter of claim 1, further comprising first and second arbitrating opportunity control signals respectively corresponding to said first and second arbitrating opportunities, wherein said first and second arbitrating opportunity control signals are both valid in said second segment burst data transfer state, only said second arbitrating opportunity control signal is valid in said third or fourth segment burst data transfer state, and a time interval of said first arbitrating opportunity is longer than that of said second arbitrating opportunity.

5. The arbiter of claim 1, wherein said arbitration state machine determines status of a slave device according to a busy state signal from said slave device.

6. The arbiter of claim 1, further comprising a reverse arbitration module for arbitrating reverse requests of returning data operations sent by said devices.

7. The arbiter of claim 6, wherein said reverse requests are divided into first and second level reverse requests, said first level reverse request has a lower priority level than said second level reverse request, said reverse arbitration module, when arbitrating said reverse requests, firstly responds to said second level reverse request, and responds to reverse requests having the same level according to priority order of slave devices issuing the reverse requests.

* * * * *